US006679037B1

(12) United States Patent
Hitt et al.

(10) Patent No.: US 6,679,037 B1
(45) Date of Patent: Jan. 20, 2004

(54) SUSPENSION DEVICE

(75) Inventors: Brian James Hitt, Hartford, WI (US); Brian David Seegert, Hartford, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/247,318

(22) Filed: Sep. 20, 2002

(51) Int. Cl.[7] .............................................. A01D 34/64
(52) U.S. Cl. ........................................ 56/15.6; 56/14.7
(58) Field of Search ............................... 56/15.6, 15.7, 56/15.8, 320.1, 320.2, 10.3, DIG. 9, DIG. 22, 12.7, 14.7, 14.9, 16.3, DIG. 14

(56) References Cited

U.S. PATENT DOCUMENTS

| 5,025,617 A | | 6/1991 | Kuhn et al. | |
|---|---|---|---|---|
| 5,154,043 A | * | 10/1992 | Schemelin et al. | 56/12.7 |
| 5,528,889 A | * | 6/1996 | Kure et al. | 56/15.6 |
| 5,937,625 A | | 8/1999 | Seegert | |
| 5,956,932 A | * | 9/1999 | Schmidt | 56/15.6 |

* cited by examiner

Primary Examiner—Robert E. Pezzuto

(57) ABSTRACT

A device for suspending a mower cutting deck that includes a retention member connected with the frame of a vehicle. The retention member receives a linkage bridging the cutting deck and the frame. To receive this linkage, the retention member includes a channel having a top end through which the linkage is inserted and a bottom end in which the linkage seats when the deck and the frame are connected. A throat portion is provided between the top and bottom ends. The throat portion is laterally offset from the ends and provides an abutment which opposes inadvertent vertical movement of the linkage beyond the bottom end to substantially prevent it from moving out of the retention member. With this opposition, the deck can maintain its attachment with the frame of the vehicle while using a minimal amount of hardware.

7 Claims, 4 Drawing Sheets

SUSPENSION DEVICE

FIELD OF THE DISCLOSURE

This disclosure relates to the connection of a mower cutting deck to the frame of a vehicle, and more specifically, to a suspension mechanism that provides and maintains that connection while using a minimal amount of hardware.

BACKGROUND OF THE DISCLOSURE

A variety of suspension mechanisms have been used to connect a mower cutting deck, and specifically its front portion, with the frame of a vehicle. This connection has been made by a linkage joining the front portion of the deck to the frame. In making this connection, the linkage has been received by a pair of brackets wherein one of which has been provided on the deck's front portion and the other of which has been provided on the vehicle frame.

In considering the design and operation of at least one of these mechanisms, it has been observed that the above-mentioned linkage has a tendency to become disconnected from one or both of the brackets. This has happened as the vehicle is operated over rough ground surfaces. To reduce the possibility of disconnection, this mechanism has further included a member secured to the frame to block movement of the linkage. Because movement of the linkage is blocked, connection of the deck to the frame has been maintained.

When the above mechanism is used however, the initial expense of the vehicle is increased as are its maintenance costs resulting from any necessary replacement of the hardware. An example of a design having the above hardware may be found in U.S. Pat. No. 5,937,625 to Seegert.

SUMMARY OF THE DISCLOSURE

Accordingly, there is provided a suspension mechanism which retains connection of the deck with the frame even when the deck is operated over rough ground surfaces. Further, this mechanism retains that connection with a reduced number of parts when compared with prior suspension mechanisms. As a result, the cost of the mechanism and the vehicle to which the deck is attached are each decreased.

The mechanism suspends a mower cutting deck beneath the mid-portion of a vehicle, optionally provided as a lawn and garden tractor. To do so, the mechanism includes first and second linkages which allow that suspension. The first, or front, linkage supports the front portion of the deck from the frame. The second, or rear, linkage supports the rear portion of the deck from the frame.

As stated before, the front linkage connects the front portion of the deck with the tractor frame. To do this, the front linkage includes a straightened end or rod portion having threads thereon and a connected angular portion which is non-threaded.

The non-threaded end is releasably received in a bracket attached to the deck. The threaded end is received by, or in, a channel formed in a retention member, preferably consisting of a further bracket, that is fixedly attached to the tractor frame. A ball member and nut are attached to the threaded end, each of which is also received by the channel to enable connection of the deck with the frame.

The ball member abuts against a spherical socket portion of the retention member for permitting the linkage to pivot in response to the contour of the ground surface. The nut is tightened against the ball member to cause the ball member to bear against the spherical surface and thereby place the linkage in tension. Distribution of this tension force substantially prevents the linkage from disengaging from the retention member. Further, this tensioning assists in positioning the deck relative to the ground surface.

The channel of the retention member includes an enlarged top end or portion in order to receive the rod, the ball member and the nut when connecting the deck to the frame. After insertion within the top portion, the rod is moved through a middle or throat portion which shifts laterally of the centerline of the top portion of the channel. The throat portion then leads downwardly to a bottom portion which is smaller in size than the top portion of the channel. The smaller dimension(s) of this bottom portion permits the rod portion, along with its ball member, to become fully and firmly seated therein when the rod is placed in full tension. As a result, connection of the deck to the frame may be firmly established.

Because of its lateral shift, the throat portion provides a path along which the rod travels when it is moved between the top and bottom portions of the channel. At times of inadvertent vertical movement of the linkage from the bottom, smaller portion of the channel (as may be possible when the tractor is operated over rough ground surfaces), the rod will abut a surface of the retention member along this path. This surface provides a stop or abutment which limits vertical travel of the linkage beyond the stop. Thus, the likelihood of unintended movement of the rod from the bottom end portion to the larger top end portion, and thereafter out of the channel, is decreased. Accordingly, the deck may be prevented from becoming disconnected from the tractor frame without the need for additional hardware previously used solely in blocking movement of the linkage.

The above and additional features and advantages of the present disclosure will become apparent from a reading of the following detailed description of the drawings when taken in conjunction therewith.

THE DRAWINGS

FIG. 1 is a side view of the vehicle, as described in the present disclosure.

FIG. 2 is a perspective view of the connection between a front portion of a mower cutting deck and the vehicle.

FIG. 3 is a partial front view of the connection of the front portion of the mower cutting deck and the vehicle.

FIG. 4 is a sectional view according to lines 4—4 of FIG. 3 wherein elements used in connecting the vehicle and the mower cutting deck are shown in exploded form.

FIG. 5 is a perspective view according to lines 5—5 of FIG. 4, without any of the exploded elements of FIG. 4 being shown therein.

DESCRIPTION OF THE DRAWINGS

Looking to FIG. 1, there is shown a lawn and garden tractor 10 having an engine 11 carried by a frame 12. The frame 12 is supported upon ground engaging wheels 14. A cutting deck 16 is connected at the mid-portion 22 of the tractor 10 and includes front and rear portions 18 and 20 between which a cutting blade (not shown) is housed.

The front portion 18 of the deck 16 is connected to the frame 12 by a first, or front, suspension mechanism 24 for supporting the front portion 18 of the cutting deck 16 above the ground. A second, or rear, suspension mechanism 26 of a type generally known in the art connects the rear portion 20 of the deck 16 with the frame 12. Each of the front and rear suspension mechanisms 24 and 26 enable the deck 16 to pivot upwardly or downwardly relative to the frame 12 in response to travel over uneven portions of the ground surface.

Figure 1:
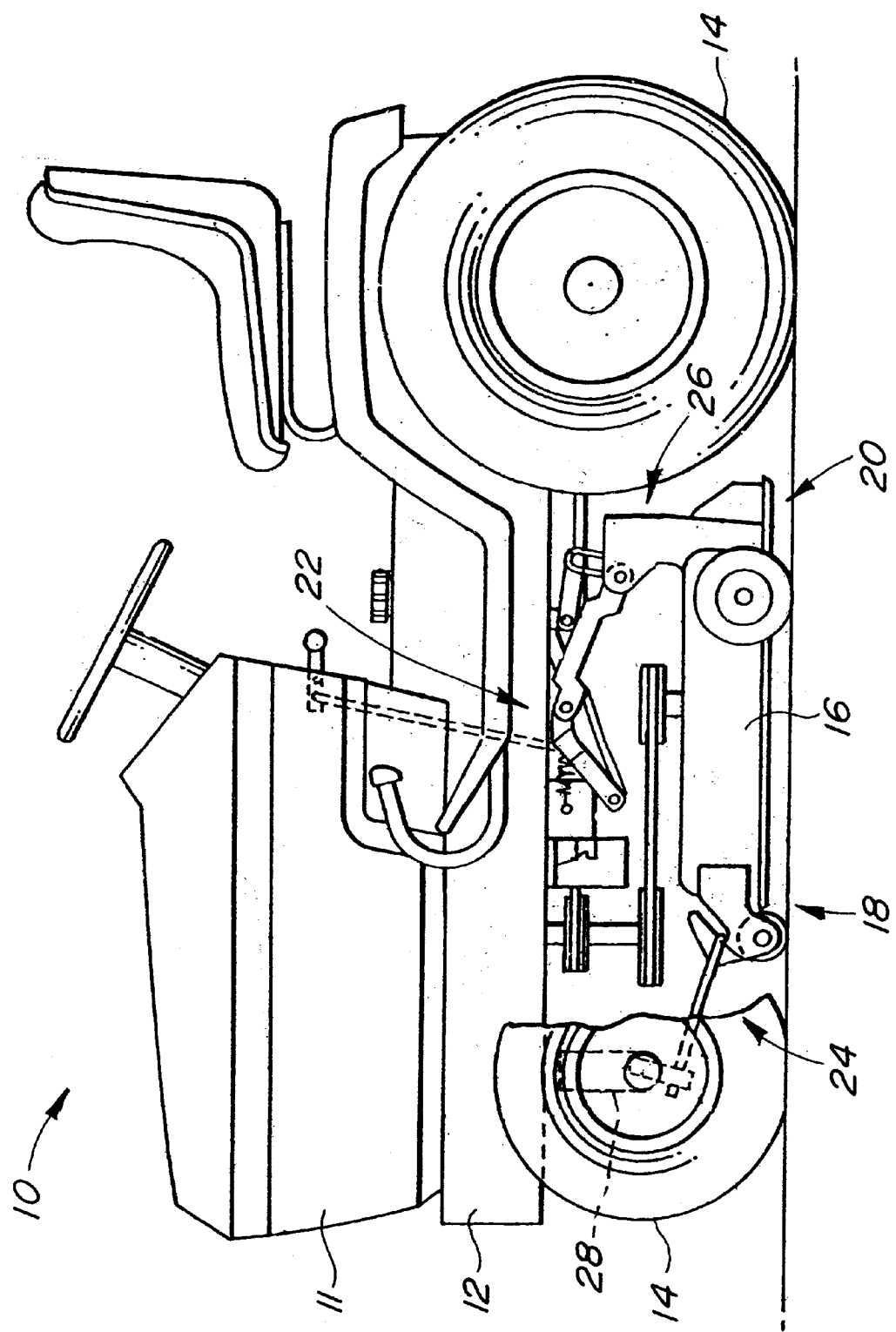
Figure 2:
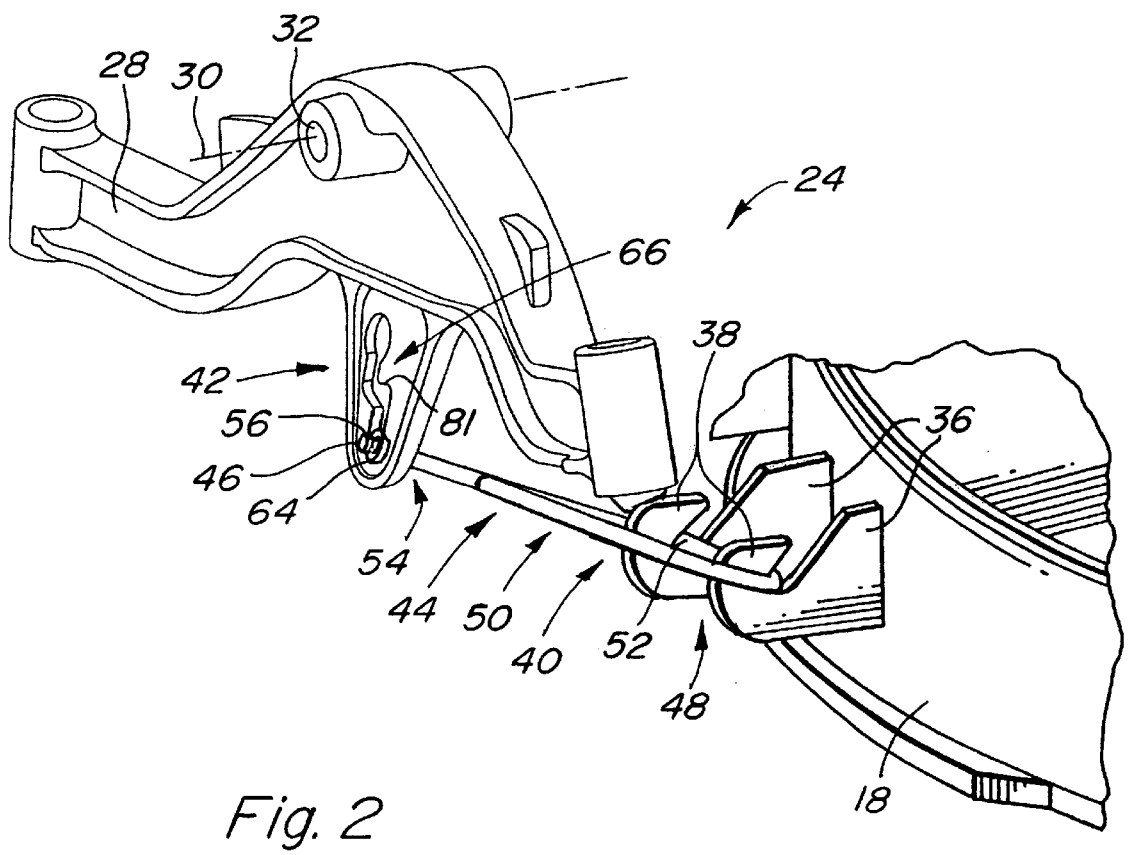

The connection of the cutting deck 16 to the tractor frame 12, and specifically to a front axle 28 that is connected with the frame 12, is shown in FIGS. 1 and 2, although most clearly in FIG. 2. The axle 28 oscillates about an axis 30 shown at 32 to allow its front wheels to move up and down relative to one another as the tractor passes over uneven ground.

The front suspension mechanism 24 includes a first structure provided as a pair of brackets 36 attached to the front portion 18 of the cutting deck 16. Each of these brackets 36 includes a hook 38 on the end 40 thereof for receiving a portion of a linkage (as discussed below).

Figure 3:
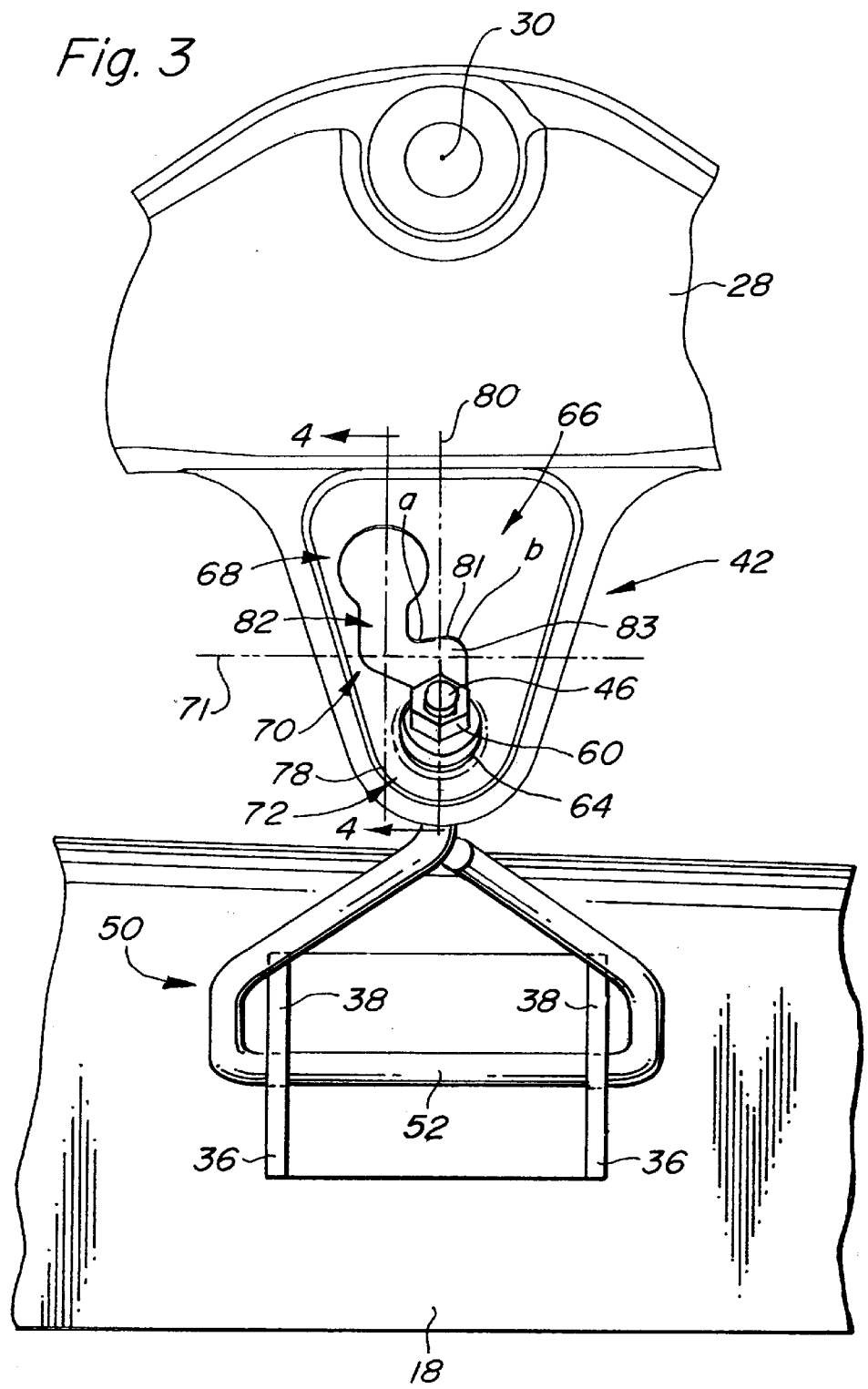

As shown in both FIGS. 2 and 3, the front suspension mechanism 24 also includes a second structure provided as a structural or retention member 42 attached to the axle 28. Further included as part of the mechanism 24 is a linkage 44. The linkage 44 provides a connection between the deck brackets 36 and the axle 28 and, in doing so, enables suspension of the deck 16 above the ground.

The linkage 44 includes first and second or, alternatively, threaded and non-threaded ends 46,48. As further shown, the non-threaded end 48 is provided as a triangular portion 50 having a laterally extending segment 52 that is received by the deck brackets 36. At its opposite end 46, the linkage 44 includes a generally straight rod member 54, as seen most clearly in FIG. 2, which includes threads 56.

Figure 4:
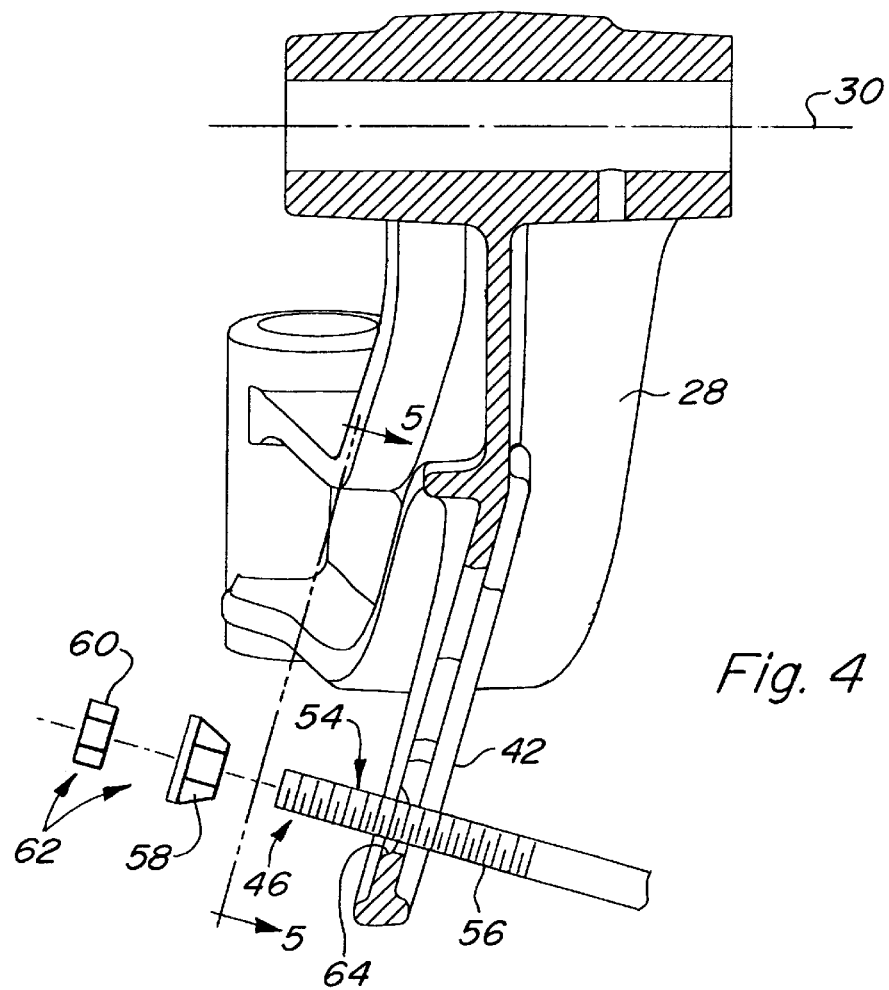

Looking to FIG. 4, the rod member 54 receives a loosely fitting non-threaded ball member 58. A threaded nut 60 is then paired with the ball member 58 to form a retention unit, generally designated as 62, for holding the rod member 54 in fitting or mating engagement with a spherical socket portion 64 of the retention member 42. This fitting engagement, as can be seen in FIGS. 2 and 3, permits the linkage 44 to pivot as the deck 16 moves vertically, as may be the case during its movement across uneven ground.

Figure 5:
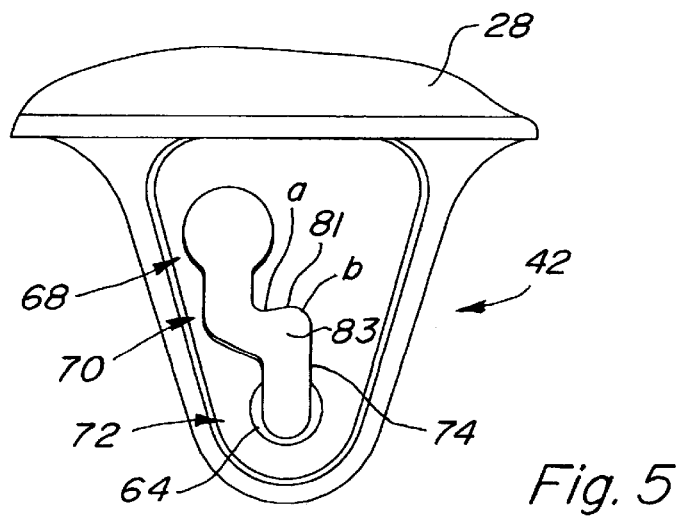

Referring again to FIG. 3, a perspective view of the front suspension mechanism 24 is provided. As shown in FIGS. 3 and 5, the retention member 42 includes a substantially S-shaped vertical opening or channel 66 generally including first, second and third or, alternatively, top, middle and bottom portions 68, 70 and 72, respectively. The top portion or end 68 is substantially larger than the bottom portion or end 72. The larger dimension of the top end 68 enables relatively easy insertion and removal of the threaded end 46 of the rod member 54 (and its retention unit 62) into and from the channel 66 (as discussed below). The middle or throat portion 70 of the channel 66 is substantially oblong and winding Because of this shape, a lateral passage or transition is formed between the top end 68 and the bottom end 72 and along an axis 71. As a result of this lateral transition, a centerline or axis 78 passing through the top end 68 is laterally offset from a respective centerline or axis 80 passing through the bottom portion 72 of the channel 66.

The front portion 18 of the deck 16 can easily be detached from the tractor 10 when removing the deck 16 to perform maintenance on it or any cutting blades therein. To begin that detachment, an operator may grasp and then tilt the rod 54 slightly upwardly toward the top end 68 of the channel 66. Alternatively, the operator may tilt the front portion 18 of the deck 16 at a slightly upward angle relative to its resting position. Doing either of these acts adjusts the angular position of the rod member 54 relative to the channel 66 and the deck 16 to permit the ball member 58 to be taken out of contact with the socket portion 64. Thereafter, the rod member 54 and its associated retention unit 62 may be maneuvered upwardly and toward a stop or abutment 81 and then laterally through the throat portion 70. Following lateral movement through the throat portion 70, the rod member 54 may be aligned with the centerline 78 of the top end 68 and then moved upwardly again and centered within the top end 68. Then, the rod member 54 may be moved through the top end 68 so as to detach the front portion 18 of the deck 16 from the frame 12.

To re-attach the linkage 44 with the frame 12, the above process is essentially reversed. First, an operator need only insert the laterally extending segment 52 of the linkage 44 within each of the deck brackets 36 and then lift it and the attached deck vertically. Next, the rod member 54, with the ball member 58 and the nut 60 attached thereto, may be passed through the enlarged top end 68 of the channel 66. Once this is done, the rod member 54 may be moved laterally through the throat portion 70 and then seated within the bottom end 72 of the channel 66.

The abutment 81 substantially restricts inadvertent and direct vertical movement of the rod member 54 from the bottom end 72 of the channel 66 and above the abutment 81 when the tractor moves over rough ground surfaces. Restriction in the vertical movement of the rod member 54 from the bottom end 72 to a point above the abutment 81 results since the linkage 44 cannot unintendedly move upwardly and directly from the bottom end 72 to the top end 68, as shown in FIG. 3, without contacting the abutment 81. When such contact does occur, the rod member 54 will be urged toward a corner 83 of the channel 66 and then tend to be held thereat given the tendency of the rod 54 to ride along the curved or bent portion of the abutment that exists from a first point "a" to a second point "b". As ground conditions smoothen, the rod member 54 will likely then move back toward and into the lower end 72 of the channel 66. Thus, inadvertent movement of the rod member 54 toward the top end 68, whereat it could become disengaged from the retention member 42, is substantially disallowed so as to therefore maintain connection of the deck 16 with the axle 28 and therefore the frame 12.

Accordingly, there is provided a suspension device which substantially prevents inadvertent disconnection of a mower cutting deck from a vehicle frame while using a minimal amount of hardware to do so.

Having provided the above description, it will become apparent that various modifications can be made without departing from the scope of that description as further defined in the accompanying claims.

We claim:

1. In a vehicle having a frame supported upon a plurality of wheels for supporting and moving the vehicle across the ground surface, an engine supported on the frame, a cutting deck for housing at least one cutting blade powered by the engine, a suspension device supporting the cutting deck above the ground, the suspension device including a retention member connected with the frame and having a channel therein, a linkage including a first end disposed through the channel and a second end connected with the deck for joining the deck to the frame, the linkage including a retention unit adjustably connected with its first end to assist in retaining the linkage within the opening, the improvement comprising:

wherein the channel is substantially S-shaped and includes top, middle and bottom portions, the middle portion forming a lateral transition between the top and bottom portions.

2. In a vehicle having a frame supported upon a plurality of wheels for supporting and moving the vehicle across the ground surface, an engine supported on the frame, a cutting deck housing at least one cutting blade powered by the engine, a suspension device supporting the cutting deck above the ground, the suspension device including a retention member connected with the frame and having a channel therein, a bracket connected with the cutting deck and a linkage including a first end which extends through the channel and a second end connected with the bracket to join the cutting deck to the frame, the linkage including a retention unit adjustably connected with its first end to retain the linkage within the opening, the improvement comprising:

wherein the channel is defined by and includes a generally non-linear periphery, the channel being further defined by top and bottom ends and a mid-portion therebetween, each of the ends being non-aligned and generally circular in shape, the mid-portion being generally oblong and extending along an axis generally transverse to axes which pass through the midpoints of the top and bottom ends respectively, the mid-portion generally defining a lateral passage through which the linkage moves during its connection with or removal from the retention member.

3. The vehicle of claim 2 wherein:

the periphery of the channel defines an abutment therealong, the abutment requiring lateral movement of the linkage between the top and bottom ends of the channel.

4. The vehicle of claim 3 wherein:

the abutment substantially restricts direct vertical movement of the linkage from the bottom end to the top end of the channel.

5. The vehicle of claim 3 wherein:

the abutment is curved from a first point to a second point therealong to substantially restrict direct vertical movement of the linkage from the bottom end to the top end of the channel.

6. The vehicle of claim 1 wherein:

the channel is substantially S-shaped about a line extending from the top end to the bottom end.

7. A mower deck suspension device comprising:

a) a first structure adapted to be carried by a mower deck;

b) a second structure adapted to be carried by a vehicle frame or portions thereof, the second structure being defined by a substantially continuous opening having at least first and second end portions, the opening having a substantially non-linear path such that the longitudinal centerlines passing through each of the end portions are offset from one another; and c) a linkage for connecting the first and second structures to carry and support the deck above the ground, the linkage being insertable within the channel through vertical and lateral movement from the first to second end portions, direct vertical movement of the linkage from the second end portion to the first end portion being restricted by the portion of the second structure lying between the respective centerlines of the first and second end portions.

* * * * *